US011131682B2

(12) United States Patent
Hara et al.

(10) Patent No.: US 11,131,682 B2
(45) Date of Patent: Sep. 28, 2021

(54) AUTOMATIC ANALYZER

(71) Applicant: HITACHI HIGH-TECHNOLOGIES CORPORATION, Tokyo (JP)

(72) Inventors: Masaki Hara, Tokyo (JP); Tetsuji Kawahara, Tokyo (JP); Hiroyuki Takayama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 230 days.

(21) Appl. No.: 16/331,603

(22) PCT Filed: Aug. 7, 2017

(86) PCT No.: PCT/JP2017/028536
§ 371 (c)(1),
(2) Date: Mar. 8, 2019

(87) PCT Pub. No.: WO2018/055931
PCT Pub. Date: Mar. 29, 2018

(65) Prior Publication Data
US 2020/0225254 A1    Jul. 16, 2020

(30) Foreign Application Priority Data
Sep. 23, 2016  (JP) .............................. JP2016-185030

(51) Int. Cl.
*G01N 1/14*        (2006.01)
*G01N 35/10*       (2006.01)
*G01N 35/02*       (2006.01)

(52) U.S. Cl.
CPC .............. *G01N 35/10* (2013.01); *G01N 1/14* (2013.01); *G01N 35/025* (2013.01)

(58) Field of Classification Search
CPC ......... G01N 35/10; G01N 1/14; G01N 35/025
See application file for complete search history.

(56) References Cited

U.S. PATENT DOCUMENTS

2010/0098590 A1    4/2010  Inamura et al.
2015/0000428 A1    1/2015  Fukuda et al.

FOREIGN PATENT DOCUMENTS

JP          63-52064 A      3/1988
JP          05-27674 U      4/1993
(Continued)

OTHER PUBLICATIONS

International Search Report of PCT/JP2017/028536 dated Oct. 31, 2017.
(Continued)

*Primary Examiner* — Jamel E Williams
(74) *Attorney, Agent, or Firm* — Mattingly & Malur, PC (57) ABSTRACT

The automatic analyzer includes a gear pump that supplies cleaning water to reagent probes and sample probes; a cleaning flow path that feeds the cleaning water discharged from the gear pump to the respective probes; a pressure sensor that measures pressure of the cleaning flow path; a return flow path that is disposed in parallel to the gear pump and connects a discharging port side of the gear pump and an aspirating port side thereof; a throttling unit that is disposed in the return flow path and adjusts a flow rate of the cleaning water flowing through the return flow path; and a control unit that changes an opening and closing degree of the throttling unit according to a measurement result of the pressure sensor. Accordingly, it is unnecessary to control driving of a pump used for cleaning a probe while having a low cost and a small mounting size.

11 Claims, 4 Drawing Sheets

(56) References Cited

FOREIGN PATENT DOCUMENTS

| | | | |
|---|---|---|---|
| JP | 2003-287545 A | | 10/2003 |
| JP | 3123748 U | | 7/2006 |
| JP | 2011-7568 A | | 1/2011 |
| JP | 2014-25812 A | | 2/2014 |
| JP | 2014025812 A | * | 2/2014 |
| JP | 2015-10894 A | | 1/2015 |
| JP | 2016-121923 A | | 7/2016 |
| JP | 2016121923 A | * | 7/2016 |
| WO | 2010/150502 A1 | | 12/2010 |

OTHER PUBLICATIONS

International Preliminary Report on Patentability received in corresponding International Application No. PCT/JP2017/028536 dated Apr. 4, 2019.
Extended European Search Report received in corresponding European Application No. 17852712.3 dated May 14, 2020.

* cited by examiner

AUTOMATIC ANALYZER

TECHNICAL FIELD

The present invention relates to an automatic analyzer that performs qualitative and quantitative analysis of biological samples such as blood and urine stored in a sample container.

BACKGROUND ART

PTL 1 discloses that a reagent pipette device includes a holder whose one end is pivotally supported on a shaft; a single pipette nozzle which is held at the other end of the holder; a reagent pump which is communicatively connected to the pipette nozzle, aspirates a required amount of a reagent corresponding to an item to be measured, and dispenses the aspirated reagent into a corresponding reaction tube; and a driving device which rotates and transfers the holder from a reagent aspirating position up to a cleaning position via a discharging position to the reaction tube centering on an axis and controls to elevate the holder at each position, and with respect to the reagent aspirated by the pipette nozzle, an inside of an aspirating system flow path is filled with water, the reagent and water are separated from each other using air, and only the reagent is extruded by the reagent pump and is discharged to the reaction tube at the time of discharge to be transferred to the cleaning position successively, whereby the inside of the flow path and the pipette nozzle are cleaned with the remainder of the extruded water filled in the flow path.

CITATION LIST

Patent Literature

PTL 1: JP-A-63-52064

SUMMARY OF INVENTION

Technical Problem

In an automatic analyzer, for example, a biochemical automatic analyzer, in order to perform component analysis on a biological sample (hereinafter referred to as a sample), a reagent and a sample are aspirated by a probe mounted on each aspirating mechanism and are discharged into a cell so that the sample and the reagent react with each other to be measured with a change thereof, thereby calculating an analysis result.

In the automatic analyzer, in a state where the reagent or the sample remains in the probe, contamination of the reagent or the sample due to the carry-over may occur when dispensing the next reagent or sample.

In order to prevent the contamination, cleaning of an outer surface of the probe and cleaning of an inner surface of the probe as described in the above-described PTL 1 are performed. Out of these, the cleaning of the inner surface of the probe is generally performed by discharging inner cleaning water at a high pressure through a gear pump.

However, it is known that pressure of the gear pump is reduced due to abrasion at the time of abnormality such as the lapse of time of a gear unit or an idle operation thereof, and the like. Currently, the problem is coped with through meter confirmation of gear pump discharge pressure by an operator and a periodic adjustment of a serviceman.

Here, there has been required an automatic analyzer capable of reducing work of an operator and a service man and further improving reliability of analysis performance by providing monitoring of the gear pump discharge pressure and an adjustment function thereof performed by the automatic analyzer itself.

As a part thereof, it is conceivable that a control system that controls driving of the pump may be incorporated into the technology described in PTL 1. However, the control system of the pump is expensive, and the mounting size thereof becomes large. Therefore, there exists a problem that it is difficult to reduce a size of the automatic analyzer such that incorporation thereof is not easy.

For solving the above-mentioned problem, an object of the present invention is to provide an automatic analyzer in which it is unnecessary to control driving of a pump used for cleaning a probe while having a low cost and a small mounting size.

Solution to Problem

In order to solve the above-mentioned problem, for example, a configuration described in claims is adopted.

The present invention includes a plurality of means for solving the aforementioned problem, and one of examples is an automatic analyzer which respectively dispenses a sample and a reagent into a reaction container for reaction with each other and measures the reacted liquid, including: a dispensing probe which dispenses the reagent and the sample into the reaction container; a gear pump which supplies cleaning water to the dispensing probe; a cleaning flow path which feeds the cleaning water discharged from the gear pump up to the dispensing probe; a pressure sensor which measures pressure of the cleaning flow path; a return flow path which is disposed in parallel to the gear pump and connects a discharging port side of the gear pump and an aspirating port side thereof; a flow rate adjustment unit which is disposed in the return flow path and adjusts a flow rate of the cleaning water flowing through the return flow path; and a control unit which adjusts the flow rate of the cleaning water flowing through the return flow path by changing an opening and closing degree of the flow rate adjustment unit according to a measurement result of the pressure sensor.

Advantageous Effects of Invention

According to the present invention, it is possible to eliminate the need of controlling the driving of the pump used for cleaning the probe while having a low cost and a small mounting size. A problem, a configuration, and an effect other than those described above will be clarified through descriptions of the following embodiments.

DESCRIPTION OF EMBODIMENTS

Hereinafter, an embodiment of an automatic analyzer of the present invention will be described with reference to the drawings.

First Embodiment

Figure 1:
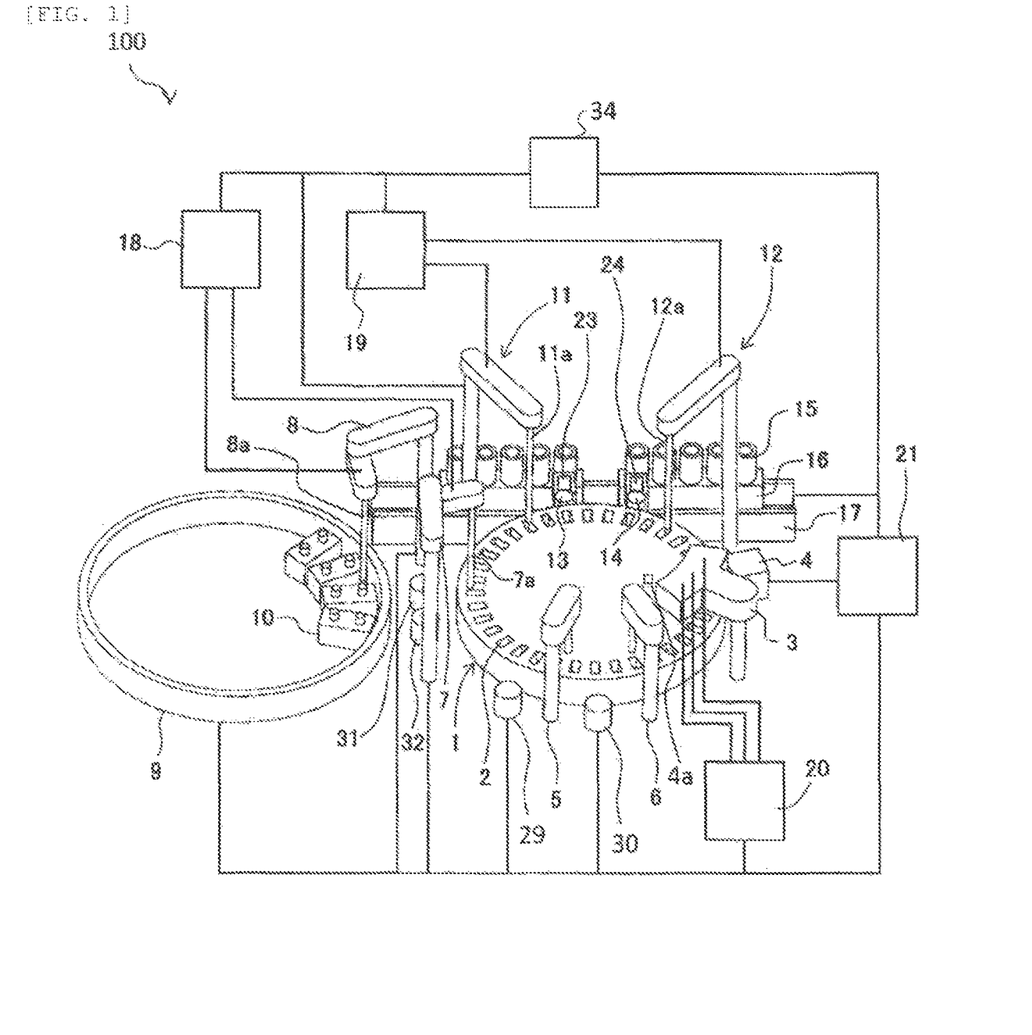
FIG. 1 is a diagram schematically illustrating an overall configuration of an automatic analyzer according to a first embodiment of the present invention.

A first embodiment of an automatic analyzer of the present invention will be described with reference to FIGS. 1 to 4. First, referring to FIG. 1, an overall configuration of the automatic analyzer will be described. FIG. 1 is a diagram schematically illustrating an overall configuration of the automatic analyzer according to the embodiment.

An automatic analyzer 100 illustrated in FIG. 1 is a device that respectively dispenses a sample and a reagent into a plurality of reaction containers 2 for reaction with each other and measures the reacted liquid, and includes a reaction disk 1, a reagent disk 9, a sample conveying mechanism 17, reagent dispensing mechanisms 7 and 8, a reagent syringe 18, a sample dispensing mechanism 11, a sample syringe 19, a cleaning mechanism 3, a light source 4a, a spectrophotometer 4, stirring mechanisms 5 and 6, a cleaning pump 20, cleaning tanks 13, 14, 29, 30, 31, and 32, and a controller 21.

The plurality of reaction containers 2 for mixing and reacting the sample with the reagent are disposed on the circumference of the reaction disk 1. The sample conveying mechanism 17 for moving a sample rack 16 on which a sample container 15 including a sample such as blood, and the like is placed is installed near the reaction disk 1.

The sample dispensing mechanisms 11 and 12 capable of rotating and moving vertically are installed between the reaction disk 1 and the sample conveying mechanism 17, and include sample probes 11a and 12a (dispensing probes), respectively. The sample syringe 19 is connected to the sample probes 11a and 12a. The sample probes 11a and 12a move while drawing a circular arc centering on the rotation axis, and dispense the sample from the sample container 15 conveyed to a sample dispensing position by the sample conveying mechanism 17 to the reaction container 2.

The cleaning tank 13 that cleans the sample probe 11a with cleaning water and a cleaning container 23 that cleans the sample probe 11a with special cleaning water are disposed in an operation range of the sample dispensing mechanism 11, and the cleaning tank 14 that cleans the sample probe 12a with the cleaning water and a cleaning container 24 that cleans the sample probe 12a with the special cleaning water are disposed in an operation range of the sample dispensing mechanism 12.

In the reagent disk 9, a plurality of reagent bottles 10 can be placed on a circumference thereof. The reagent disk 9 is kept cold and covered with a cover provided with an aspirating port (not illustrated). The reagent bottle 10 is a bottle for storing the reagent used for analysis of the sample.

The reagent dispensing mechanisms 7 and 8 capable of rotating and moving vertically are installed between the reaction disk 1 and the reagent disk 9, and include reagent probes 7a and 8a, respectively. The reagent syringe 18 is connected to the reagent probes 7a and 8a. The reagent probes 7a and 8a move while drawing a circular arc centering on the rotation axis, access the inside of the reagent disk 9 from the aspirating port, and dispense the reagent from the reagent bottle 10 to the reaction container 2.

The cleaning tank 32 that cleans the reagent probe 7a with the cleaning water is disposed in an operation range of the reagent dispensing mechanism 7, and the cleaning tank 31 that cleans the reagent probe 8a with the cleaning water is disposed in an operation range of the reagent dispensing mechanism 8.

In the periphery of the reaction disk 1, there are disposed the stirring mechanisms 5 and 6 that stir a mixed liquid (reacted liquid) of the sample and the reagent dispensed into the reaction container 2, the spectrophotometer 4 that measures an absorbance of the reacted liquid by measuring transmitted light obtained from the light source 4a through the reacted liquid of the reaction container 2, the cleaning mechanism 3 that cleans the used reaction container 2, and the like.

The stirring mechanisms 5 and 6 are configured to be capable of rotating in the horizontal direction and moving vertically, and stir the mixed liquid (reacted liquid) of the sample and the reagent by being inserted into the reaction container 2. The cleaning tanks 29 and 30 that clean the stirring mechanisms 5 and 6 with the cleaning water are disposed in an operation range of the stirring mechanisms 5 and 6. Further, the cleaning pump 20 is connected to the cleaning mechanism 3.

The controller 21 is formed of a computer, and the like, controls an operation of each device and mechanism in the automatic analyzer 100, and performs a computation process for obtaining the concentration of a predetermined component in the sample.

Hereinbefore, the general configuration of the automatic analyzer 100 is described.

An analysis process of an inspection sample by the automatic analyzer 100 as described above is generally performed in the following order.

First, the sample in the sample container 15 placed on the sample rack 16 conveyed near the reaction disk 1 by the sample conveying mechanism 17 is dispensed into the reaction container 2 on the reaction disk 1 by the sample probes 11a and 12a of the sample dispensing mechanisms 11 and 12. Next, the reagent to be used for analysis is dispensed from the reagent bottle 10 on the reagent disk 9 to the reaction container 2 into which the sample is dispensed first by the reagent dispensing mechanisms 7 and 8. Subsequently, the mixed liquid of the sample and the reagent in the reaction container 2 is stirred by the stirring mechanisms 5 and 6.

Thereafter, the light generated from the light source 4a is transmitted through the reaction container 2 into which the mixed liquid after the stirring enters, such that light intensity of the transmitted light is measured by the spectrophotometer 4. The light intensity measured by the spectrophotometer 4 is transmitted to the controller 21 via an A/D converter and an interface. Then, the concentration of a predetermined component in the liquid sample such as blood, urine, and the like is obtained by performing the computation using the controller 21, after which a result is displayed on a display unit (not illustrated) and stored in a storage unit (not illustrated).

Next, a configuration for cleaning inner surfaces of the reagent probes 7a and 8a and the sample probes 11a and 12a will be described with reference to FIG. 2 and the subsequent drawings.

Since the reagent probes 7a and 8a and the sample probes 11a and 12a used for the aspiration and dispensation of the reagent and the sample are not disposable, the same probe is continuously used. Since the same probe is used, when the reagent and sample discharged in the previous operation remain in the probe, contamination occurs in the reagent and the sample for performing the aspiration in the next operation, thereby causing a possibility that an analysis result is not normally determined.

Therefore, generally, cleaning of an outer surface of the probe is performed by discharging the cleaning water toward the outer surface of the probe in the cleaning tanks 13, 14, 31, and 32. Further, cleaning of the inner surface of the probe is performed by discharging the cleaning water which is highly pressurized by the pump from the probe in the cleaning tanks 13, 14, 31, and 32. The gear pump 34 is often used to highly pressurize the cleaning water.

It is known that the pressure of the gear pump 34 decreases when using the gear pump 34 for a long period. When the cleaning water becomes low pressure, there exists a possibility that the sample or the reagent may not be sufficiently cleaned and thus may remain in the probe such that an occurrence risk of the contamination increases.

As a countermeasure against the current pressure drop, the pressure is monitored by an operator or the gear pump 34 is periodically adjusted by a serviceman, and the discharge pressure is maintained by the above-mentioned methods.

As described above, the automatic analyzer having higher reliability of analysis performance can be provided on the market by reducing the risk of contamination. Therefore, a characteristic flow path configuration of the present invention for realizing the monitoring and adjustment function of the discharge pressure of the gear pump 34 is a flow path configuration illustrated in FIG. 2. FIG. 2 illustrates a flow path configuration for cleaning the inner surfaces of the reagent probes 7a and 8a and the sample probes 11a and 12a.

The flow path for cleaning the reagent probes 7a and 8a and the sample probes 11a and 12a is formed with a water storage unit 201, the cleaning pump 20, the gear pump 34, a cleaning flow path 106, a return flow path 105, a throttling unit 101, a pressure sensor 102, a branch pipe 104, solenoid valves 107, 108, 109, and 110, reagent probe pressure sensors (probe pressure sensor) 111 and 112, sample probe pressure sensors (probe pressure sensor) 113 and 114, and a control unit 103.

The cleaning pump 20 is a pump that supplies the cleaning water stored in the water storage unit 201 to the gear pump 34 in the present flow path. The cleaning pump 20 is connected to the gear pump 34, and the gear pump 34 discharges the cleaning water toward the reagent probes 7a and 8a and the sample probes 11a and 12a by highly pressurizing the cleaning water to be supplied from the cleaning pump 20. The discharge pressure of the gear pump 34 is required to be the same level as or higher than adjustment target pressure $P_m$ of the cleaning flow path 106 which will be described later.

The cleaning flow path 106 is a flow path that feeds the cleaning water discharged from the gear pump 34 up to the reagent probes 7a and 8a and the sample probes 11a and 12a.

The pressure sensor 102 that measures the discharge pressure of the cleaning pump 20 when the gear pump 34 is stopped and the pressure of the cleaning flow path 106 during the operation of the gear pump 34 is disposed in the cleaning flow path 106. Further, the pressure sensor 102 is used together with the reagent probe pressure sensors 111 and 112 that detect the discharge pressure of the reagent probes 7a and 8a, and the sample probe pressure sensors 113 and 114 that detect the discharge pressure of the sample probes 11a and 12a, so that it is possible to confirm whether the aspiration and discharge of the reagent by the reagent probes 7a and 8a of the reagent dispensing mechanisms 7 and 8 and the aspiration and discharge of the sample by the sample probes 11a and 12a of the sample dispensing mechanisms 11 and 12 are normally in operation.

The branch pipe 104 is disposed in the cleaning flow path 106. The branch pipe 104 is provided for branching the flow path of the cleaning water into the reagent probes 7a and 8a and the sample probes 11a and 12a. Further, a filter 104a for eliminating a foreign substance having a possibility of being included in the cleaning water is provided in the flow path of the branch pipe 104.

In the cleaning flow path 106 branched by the branch pipe 104, the solenoid valves 107, 108, 109, and 110 for controlling the flow of the cleaning water are respectively included. The cleaning water flows into the reagent probes 7a and 8a or the sample probes 11a and 12a by opening the solenoid valves 107, 108, 109 and 110, whereby the cleaning is performed.

Further, in the cleaning flow path 106, there is disposed the return flow path 105 which is disposed in parallel to the gear pump 34 and connects a discharging port side of the gear pump 34 and an aspirating port side thereof. The throttling unit (flow rate adjustment unit) 101 capable of adjusting an opening and closing degree thereof is disposed in the return flow path 105 to adjust the flow rate of the cleaning water flowing through the return flow path 105. The opening and closing degree of the throttling unit 101 is adjusted by the control unit 103 which will be described later.

The control unit 103 is disposed in the controller 21, and the flow rate of the cleaning water flowing through the return flow path 105 is adjusted by changing the opening and closing degree of the throttling unit 101 according to a pressure value of the cleaning flow path 106 measured by the pressure sensor 102.

When describing the adjustment of the opening and closing degree more specifically, the control unit 103 compares the adjustment target pressure $P_m$ of the cleaning flow path 106 with the pressure value of the cleaning flow path 106 measured by the pressure sensor 102, and adjusts the throttling unit 101 in an opening direction when the pressure of the cleaning flow path 106 is higher than the adjustment target pressure $P_m$. Accordingly, since the flow rate of part of the cleaning water discharged from the gear pump 34 to flow to the aspirating port side of the gear pump 34 via the return flow path 105 increases, and the flow rate to the side of the branch pipe 104 decreases such that the pressure falls, the cleaning flow path 106 is adjusted to a low pressure side.

On the other hand, when the pressure of the cleaning flow path 106 is lower than the adjustment target pressure $P_m$, the throttling unit 101 is adjusted in a closing direction. Accordingly, since the flow rate of part of the cleaning water discharged from the gear pump 34 to flow to the aspirating port side of the gear pump 34 via the return flow path 105 decreases, and the flow rate to the side of the branch pipe 104 increases such that the pressure does not fall, the cleaning flow path 106 is adjusted to a high pressure side.

Figure 2:
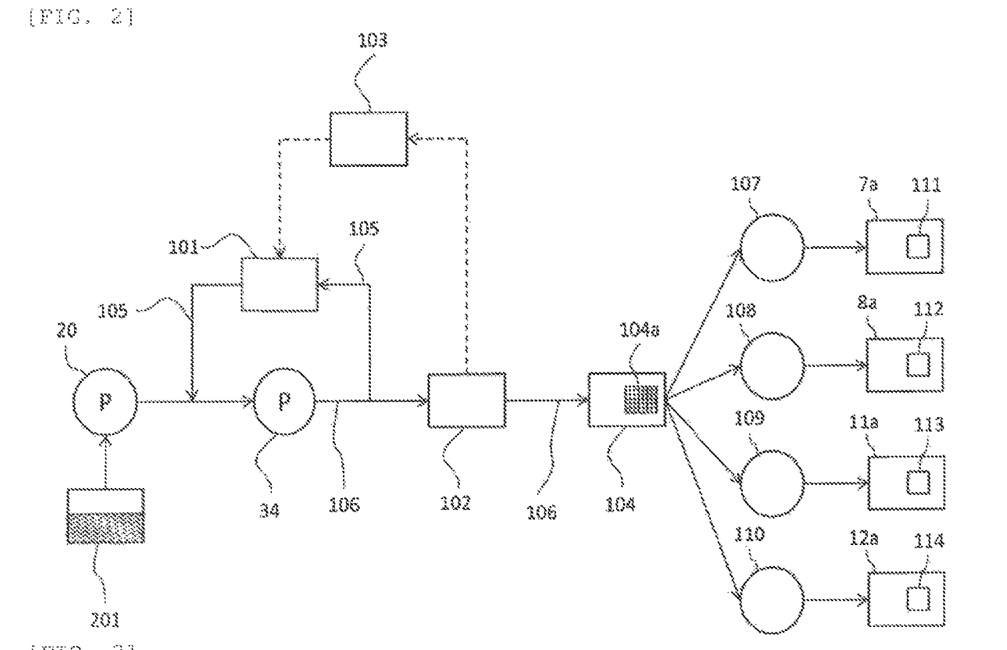
FIG. 2 is a diagram illustrating a configuration of an inner cleaning flow path of a reagent probe and a sample dispensing probe in the automatic analyzer according to the first embodiment.

FIG. 2 illustrates a configuration in which the filter 104a is incorporated on the upstream side of the flow path to prevent the foreign substance from jamming in the solenoid valves 107, 108, 109, and 110, but clogging of the filter unit is a problem to be solved. Therefore, in the above-mentioned configuration of the cleaning flow path 106, the discharge pressure of the gear pump 34 is grasped by using the pressure sensor 102, or the discharge pressure of the cleaning water of the reagent probes 7a and 8a can be detected by the reagent probe pressure sensors 111 and 112, and the discharge pressure of the cleaning water of the sample probes 11a and 12a can be detected by the sample probe pressure sensors 113 and 114. Therefore, the control unit 103 compares the discharge pressure of the gear pump 34 with the pressure of the cleaning water discharged from the reagent probes 7a and 8a and the sample probes 11a and 12a, thereby determining a clogging state of the filter 104a in the branch pipe 104. When all the pressure in all the probes is lower, the possibility of the clogging of the filter 104a is high, and when the pressure of a single probe is lower, operation failure of the solenoid valves 107, 108, 109, and 110 is suspected. Further, when it is determined that the filter 104a is clogged, the control unit 103 allows the display unit to display a warning that cleaning and replacement of the filter 104a is required, thereby urging the operator to perform the cleaning and replacement thereof.

Even when the filter 104a is not incorporated, it is possible to detect the clogging state (including the presence or absence of the clogging) of the flow path between the reagent probe pressure sensors 111 and 112 or the sample probe pressure sensors 113 and 114, or the operation failure of the solenoid valves 107, 108, 109, and 110 from the pressure sensor 102. That is, the control unit 103 can determine abnormality of the cleaning flow path 106 based upon a difference between a measured value of the pressure sensor 102 and measured values of the probe pressure sensors 111, 112, 113, and 114 of the sample or the reagent. Further, when the filter 104a exists, the control unit 103 can determine the clogging state of the filter 104a from the difference therebetween.

Further, the cleaning flow path 106 is provided with a return flow path (not illustrated) provided with an opening and closing valve (not illustrated) on a downstream side of the gear pump 34, and when cleaning the reagent probes 7a and 8a and the sample probes 11a and 12a, and adjusting the pressure of the cleaning flow path 106, the closing and opening valve is closed, and in other cases, the cleaning water discharged from the gear pump 34 returns to the water storage unit 201 by opening the opening and closing valve, thereby preventing the gear pump 34 from overheating. A relief valve may be used instead of the opening and closing valve.

Figure 3:
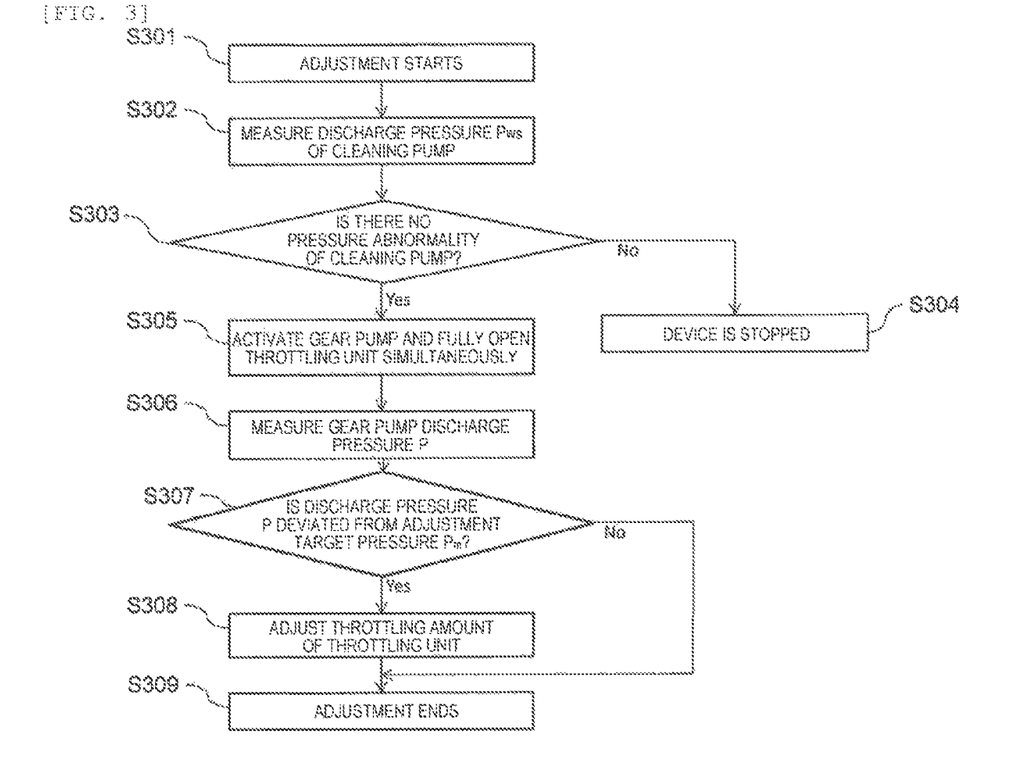
FIG. 3 is a flowchart of automatic pressure adjustment in the automatic analyzer according to the first embodiment.

A concept of a pressure adjustment flow of the cleaning flow path 106 by the control unit 103 will be described with reference to a flowchart of FIG. 3. FIG. 3 illustrates a pressure adjustment flowchart of the cleaning flow path 106 by the control unit 103.

First, automatic pressure adjustment is started when the automatic analyzer 100 is activated (step S301).

Next, the control unit 103 measures discharge pressure $P_{WS}$ of the cleaning pump 20, which is a supply source of the cleaning water, by the pressure sensor 102 (step S302).

Subsequently, the control unit 103 determines whether the discharge pressure $P_{WS}$ of the cleaning pump 20 falls within a range of a specification upper limit X of the discharge pressure and a specification lower limit Y thereof ($X<P_{WS}<Y$), such that it is determined whether the abnormality in the pressure of the cleaning pump 20 exists (step S303).

When it is determined that the discharge pressure $P_{WS}$ thereof is within the specification range (Yes), a process proceeds to step S305. On the other hand, when it is determined that the discharge pressure $P_{WS}$ thereof is out of the pressure specification range of the cleaning pump 20 (No) in Step S303, since it is considered that the abnormality occurs in the cleaning pump 20, the process proceeds to Step S304 to display an alarm on the display unit, and the automatic analyzer 100 is stopped (step S304).

Next, the control unit 103 activates the gear pump 34, and then puts the throttling unit 101 into a fully open state (step S305).

Next, the control unit 103 performs the measurement of the discharge pressure P of the gear pump 34 by using the pressure sensor 102 (step S306).

Subsequently, the control unit 103 determines whether the discharge pressure P of the gear pump 34 measured in step S306 is deviated from the adjustment target pressure $P_m$ (step S307). When a relationship between the discharge pressure P and the adjustment target pressure $P_m$ is established as $P=P_m$ (not deviated, No), the process proceeds to step S309, thereby terminating the adjustment.

On the other hand, when the discharge pressure P and the adjustment target pressure $P_m$ are not equal (deviated from each other, Yes), the process proceeds to step S308. Next, the control unit 103 performs the adjustment of the opening and closing degree (in the closing direction) of the throttling unit 101 so that a throttling amount of the throttling unit 101 is adjusted to make the discharge pressure P and the adjustment target pressure $P_m$ become equal to each other (step S308), and after the adjustment is completed, the process proceeds to step S309, thereby terminating the adjustment (step S309).

Next, an effect of the embodiment will be described.

The automatic analyzer 100 according to the first embodiment of the present invention includes the reagent probes 7a and 8a that dispense the reagent into the reaction container 2 and the sample probes 11a and 12a that dispense the sample into the reaction container 2; the gear pump 34 that supplies the cleaning water to the reagent probes 7a and 8a and the sample probes 11a and 12a; the cleaning flow path 106 that feeds the cleaning water discharged from the gear pump 34 to the reagent probes 7a and 8a and the sample probes 11a and 12a; the pressure sensor 102 that measures the pressure of the cleaning flow path 106; the return flow path 105 that is disposed in parallel to the gear pump 34 and connects the discharging port side of the gear pump 34 and the aspirating port side thereof; the throttling unit 101 that is disposed in the return flow path 105 and adjusts the flow rate of the cleaning water flowing through the return flow path 105; and the control unit 103 that adjusts the flow rate of the cleaning water flowing through the return flow path 105 by changing the opening and closing degree of the throttling unit 101 according to the measurement result of the pressure sensor 102.

Accordingly, the discharge pressure of the gear pump 34 is monitored by the pressure sensor 102, the opening and closing degree of the throttling unit 101 of the return flow path 105 is changed according to the pressure of the cleaning flow path 106 detected by the pressure sensor 102, and the amount of the cleaning water fed from the cleaning flow path 106 up to the reagent probes 7a and 8a and the sample probes 11a and 12a is adjusted, whereby the pressure of the cleaning water in the cleaning flow path 106 can be adjusted without controlling the driving of the gear pump 34. Therefore, the pressure of the pump discharge flow path can be adjusted without introducing an expensive pump driving control system. Accordingly, it is possible to obtain the automatic analyzer that reduces the work of the operator and the serviceman, and further improves the reliability of the analysis performance without enlarging the size of the automatic analyzer. Further, since it is not required to control the number of rotations of the gear pump 34 to perform the adjustment of the pressure of the cleaning flow path 106 and it is not required to increase a load applied to the gear pump 34 more than necessary, an impact applied on gears of the gear pump is not increased due to adjustment of the number of rotations, whereby it is possible to prevent a life span of the gear pump 34 from being shortened.

Further, the control unit 103 compares the adjustment target pressure $P_m$ with the pressure value of the cleaning flow path 106 measured by the pressure sensor 102, and when the pressure value is different from the adjustment target pressure $P_m$, the pressure of the cleaning flow path 106 is adjusted to become the adjustment target pressure $P_m$, and more specifically, when the pressure of the cleaning flow path 106 is higher than the adjustment target pressure $P_m$, the throttling unit 101 is changed to the opening direction, and when the pressure of the cleaning flow path 106 is lower than the adjustment target pressure $P_m$, the throttling unit 101 is changed to the closing direction, whereby the pressure of the cleaning water in the cleaning flow path 106 can be controlled to a predetermined pressure without controlling the driving of the gear pump 34.

Further, the branch pipe 104 that respectively branches the cleaning flow path 106 into the reagent probes 7a and 8a and the sample probes 11a and 12a; and the probe pressure sensors 111, 112, 113, and 114 that measure the pressure of the cleaning water discharged from the reagent probes 7a and 8a and the sample probes 11a and 12a are further provided, and the control unit 103 determines the abnormality of the cleaning flow path 106 by comparing the measured value of the pressure sensor 102 with the measured values of the probe pressure sensors 111, 112, 113, and 114, whereby it is possible not only to grasp the abnormality such as the clogging of the cleaning flow path 106 and the operation failure of the solenoid valves 107, 108, 109, and 110, but also to surely and sufficiently perform the cleaning of the reagent probes 7a and 8a and the sample probes 11a and 12a. Therefore, the reliability of analysis performance can be further improved.

Further, the filter 104a, which is provided in the branch pipe 104, for eliminating the foreign substance in the cleaning water is further provided, and the control unit 103 determines the clogging state of the filter 104a as the abnormality, whereby it is possible not only to prevent the occurrence of pressure shortage of the cleaning water in the reagent probes 7a and 8a and the sample probes 11a and 12a caused by the clogging of the filter 104a, but also to surely and sufficiently perform the cleaning of the reagent probes 7a and 8a and the sample probes 11a and 12a. Therefore, the reliability of analysis performance can be further improved.

Figure 4:
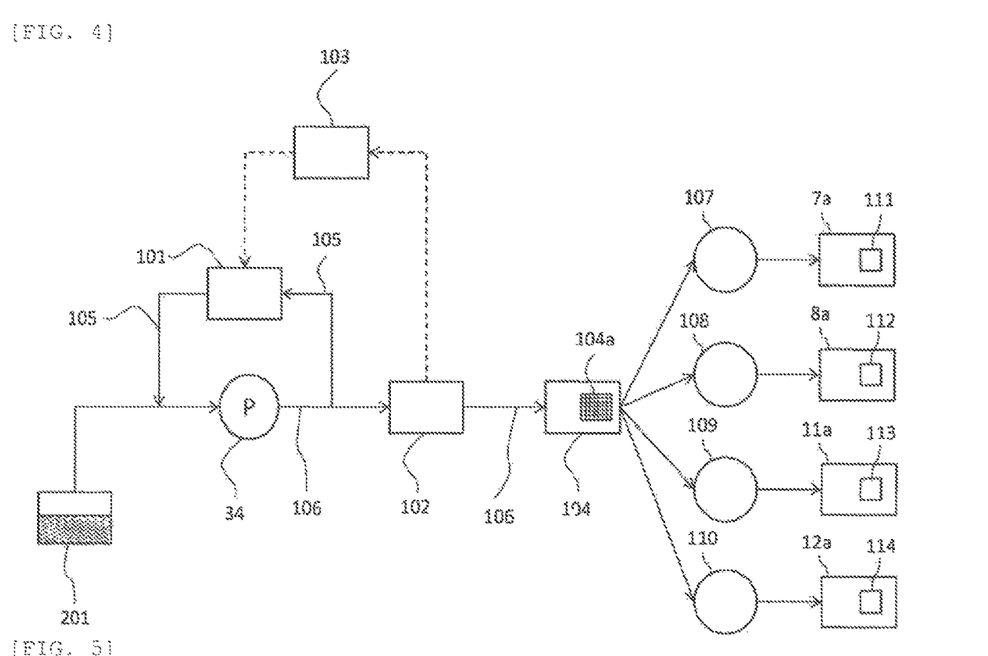
FIG. 4 is a diagram illustrating a configuration of a flow path of another form of the automatic analyzer according to the first embodiment.

Further, as illustrated in FIG. 4, even in a flow path configuration in which the cleaning water is directly circulated and highly pressurized by the gear pump 34 from the water storage unit 201 of the cleaning water formed of a water supply tank, and the like, an effect of adjusting the pressure of the cleaning flow path 106 can be obtained.

Further, it is possible to perform the adjustment of the opening direction and/or the closing direction of the throttling unit 101 by omitting Step S305 in FIG. 3.

Second Embodiment

Figure 5:
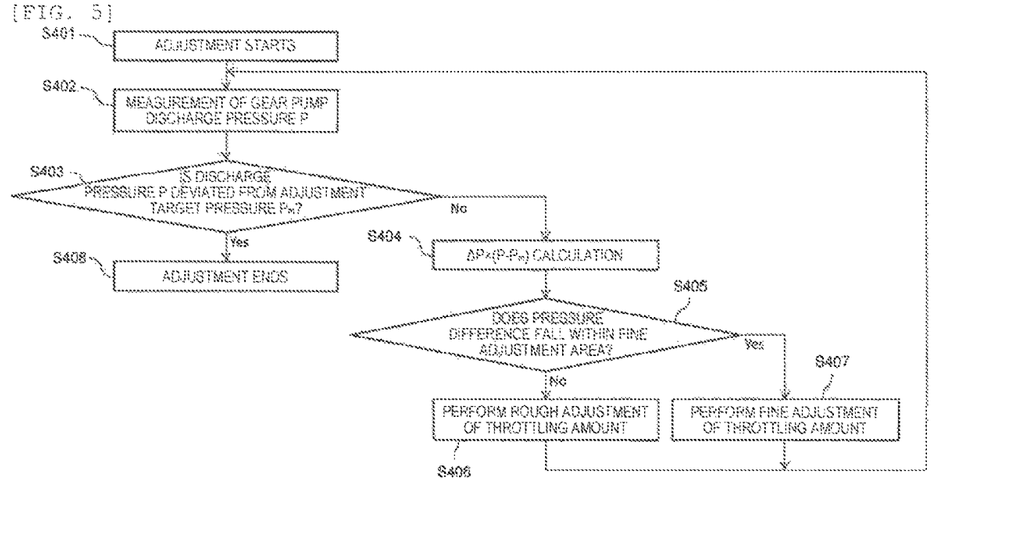
FIG. 5 is a flowchart of control of pressure adjustment using a proportional solenoid valve in an automatic analyzer according to a second embodiment of the present invention.
Figure 6:
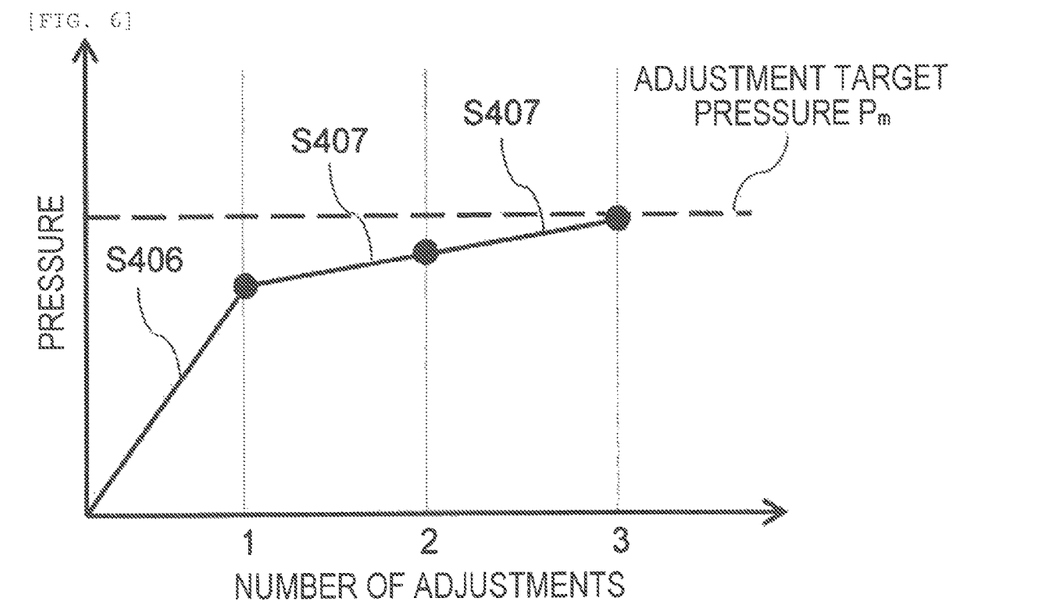
FIG. 6 is a diagram illustrating an adjustment image of an opening and closing degree of the proportional solenoid valve in the automatic analyzer according to the second embodiment.

An automatic analyzer according to a second embodiment of the present invention will be described with reference to FIG. 6. The same configuration as the automatic analyzer according to the first embodiment illustrated in FIGS. 1 to 5 will be denoted by the same reference sign, and descriptions thereof will be omitted. The same also applies to the embodiment described hereinafter.

The automatic analyzer of the embodiment uses a proportional solenoid valve for the throttling unit 101 in the automatic analyzer 100 according to the first embodiment.

In the automatic analyzer of the embodiment, when the pressure of the cleaning flow path 106 is adjusted to the adjustment target pressure $P_m$, the control unit 103 limits the opening and closing direction of the proportional solenoid valve to one direction, and performs the adjustment of the opening and closing degree in multiple stages. More specifically, in the embodiment, the proportional solenoid valve is adjusted in multiple stages only in the closing direction. This is caused by the reasons described below.

The proportional solenoid valve can freely adjust the opening and closing degree of the flow path by an applied current or voltage. However, it is known that hysteresis occurs in the proportional solenoid valve. Therefore, even though the same current value and voltage value are applied, it is known that the opening and closing degree is deviated depending on a case where the adjustment is performed in the opening direction or a case where the adjustment is performed in the closing direction.

Here, when controlling the proportional solenoid valve, it is desirable to limit the opening and closing direction to always be limited to a constant direction so as not to exceed the adjustment target pressure $P_m$. The control described below is a control method by the current, but the adjustment can be performed by replacing the current with the voltage.

As described above, since the proportional solenoid valve has the hysteresis, it is required to fix an applied current direction to the proportional solenoid valve to either one of the rising and falling directions to accurately perform the adjustment to the adjustment target pressure $P_m$. In the embodiment, in consideration of the pressure resistance safety of the flow path, the proportional solenoid valve is set to be adjusted from the fully open state to make the adjustment possible even in a flow path which cannot cope with high pressure. Therefore, the proportional solenoid valve uses a type which becomes the fully open state when the power source is turned off.

Further, as described, the gears of the gear pump 34 wear and thus the discharge pressure decreases by using the gear pump 34 with the lapse of time. In a case where the proportional solenoid valve is used in the throttling unit 101, when the discharge pressure is maintained at a constant value, the opening and closing degree of the proportional solenoid valve changes with the lapse of time due to the decrease of the discharge pressure of the gear pump 34. Here, the control unit 103 records a transition of the applied current (or voltage), the life span of the gear pump 34 and the recommended replacement time thereof are predicted based upon the recorded transition, and the recommended replacement time, and the like are displayed on the display unit. Further, when the recommended replacement time is reached, the control unit 103 causes the display unit and the like to display that the operator is required to replace the gear pump 34, or notifies the serviceman of a fact that the pump replacement is required at the next time of maintenance through communication.

Prediction of the life span will be described. For example, a controllable range of the control unit 103 is represented by a current I or a voltage V at the time of control, and an application current $I_{limit}$ or an application voltage $V_{limit}$ of an adjustable limit in which the proportional solenoid valve is into the approximately fully open state. The current value or the voltage value becomes an adjustable limit value. The adjustable limit value of the gear pump 34 changes due to deterioration. A characteristic change of the adjustable limit value with the lapse of time is previously grasped and stored by a life span test, whereby the control unit 103 can predict a remaining life span by a difference between the current adjustable limit value and the adjustable limit value which becomes the life span of the gear pump 34.

Next, a concept of a pressure adjustment flow of the cleaning flow path 106 by the control unit 103 of the embodiment will be described with reference to a flowchart illustrated in FIG. 5. FIG. 5 illustrates a pressure adjustment flowchart of the cleaning flow path 106 by the control unit 103.

First, the automatic pressure adjustment is started when the automatic analyzer 100 is activated (Step S401).

Next, the control unit 103 activates the gear pump 34, and performs the measurement of the discharge pressure P of the gear pump 34 by using the pressure sensor 102 (step S402). Further, failure determination of the cleaning pump 20 in steps S302 to S304 illustrated in FIG. 3 may be performed between steps S401 and S402.

Next, the control unit 103 determines whether the discharge pressure P of the gear pump 34 measured in step S402 is deviated from the adjustment target pressure $P_m$ (step S403). When a relationship between the discharge pressure P and the adjustment target pressure $P_m$ is established as P=$P_m$ (not deviated, No), the process proceeds to step S408, and the adjustment is terminated without performing the adjustment of the opening and closing degree of the proportional solenoid valve. On the other hand, when the discharge pressure P and the adjustment target pressure $P_m$ are not equal (deviated from each other, Yes), the process proceeds to step S404.

Subsequently, the control unit 103 calculates a differential pressure ΔPx between the discharge pressure P and the adjustment target pressure $P_m$ to determine the applied current to the proportional solenoid valve (step S404).

Thereafter, the control unit 103 determines whether the calculated differential pressure ΔPx enters a fine adjustment area, and then determines whether the opening and closing degree of the proportional solenoid valve is adjusted by either fine adjustment or rough adjustment (step S405). When it is determined that the differential pressure ΔPx does not enter the fine adjustment area (No), the process proceeds to step S406, and when it is determined that the differential pressure ΔPx enters the fine adjustment area (Yes), the process proceeds to step S407.

The flow of steps S404 to S407 is caused by the reasons described below. When the adjustment is terminated once in the control of the opening and closing degree of the proportional solenoid valve, there may be a possibility that the adjustment may exceed the target pressure $P_m$ due to pressure variation factors such as water temperature, and the like, however, as described above, the proportional solenoid valve has the hysteresis. In the proportional solenoid valve, it is not easy to perform the adjustment to the closing direction after the adjustment to the opening direction and the adjustment to the opening direction from the closing direction. Therefore, basically, the adjustment is performed at least twice in the order of the fine adjustment (step S407) after the rough adjustment (step S406), so that the adjustment is performed so as not to exceed the adjustment target pressure $P_m$.

An equation (1) that determines the applied current for performing the rough adjustment in step S406 is determined as follows.

$$I = \frac{\Delta Px}{M} - M \cdot A \tag{1}$$

Here, "I" represents the applied current; ΔPx represents a differential pressure between the pressure when the proportional solenoid valve is fully opened and the adjustment target pressure $P_m$; "M" represents a graph inclination value from a corresponding relationship between the applied current to the proportional solenoid valve and the pressure of the cleaning flow path 106; and "A" represents the number of setting of the fine adjustment.

Further, in order to perform the fine adjustment after the rough adjustment, the setting of the fine adjustment in step S407 is to apply a current which becomes less than ½ of ΔPx.

According to the above-mentioned adjustment method, the adjustment can be performed without exceeding the adjustment target pressure $P_m$. A series of adjustment images are illustrated in FIG. 6. FIG. 6 illustrates that the pressure is adjusted to the adjustment target pressure $P_m$ by performing the fine adjustment twice after performing the rough adjustment once.

After the rough adjustment in step S406 or the fine adjustment in step S407, the process returns to step S402 in which the measurement of the discharge pressure of the gear pump 34 is performed, and in step S403, it is confirmed again whether the pressure becomes P=$P_m$. When the pressure does not become P=$P_m$, the process returns to step S405 again until the pressure becomes P=$P_m$, and the adjustment is repeatedly performed.

Other configurations and operations are approximately the same as those of the automatic analyzer according to the first embodiment described above, and the details thereof will be omitted.

Even in the automatic analyzer according to the second embodiment of the present invention, approximately the same effect as that of the automatic analyzer according to the first embodiment described above can be obtained.

Further, the throttling unit 101 is the proportional solenoid valve, and when the pressure of the cleaning flow path 106 is adjusted to the adjustment target pressure $P_m$, the control unit 103 limits the opening and closing direction of the proportional solenoid valve to one direction, and the proportional solenoid valve can be controlled so that the pressure value of the cleaning flow path 106 becomes the predetermined pressure without being affected by the hysteresis by performing the adjustment of the opening and closing degree in multiple stages.

Further, the control unit 103 adjusts the proportional solenoid valve in multiple stages only in the closing direction, whereby it is possible to control the proportional solenoid valve more easily and surely so that the pressure value of the cleaning flow path 106 becomes the predetermined pressure without being affected by the hysteresis; the cleaning flow path 106 can be adjusted in the lowest pressure state; it is possible to avoid using the discharge pressure of the gear pump 34 in the highest pressure state; it is possible to prevent a load applied to the gear pump 34 from becoming large; and it is possible to prevent a life span from being shortened.

Further, the throttling unit 101 is the proportional solenoid valve, and the control unit 103 records the transition of the control value for driving the proportional solenoid valve and determines the life span of the gear pump 34, thereby making it possible not only to reduce a load applied to the operator and the serviceman, but also to operate the stable gear pump 34, such that the automatic analyzer having high reliability can be provided.

Further, the embodiment is not limited thereto. When it is not required to consider the pressure resistance safety of the flow path, and the like, the proportional solenoid valve is not limited to the adjustment from the fully open state, and can be also adjusted from the fully closed state. The adjustment from the fully closed state also performs the fine adjustment after the rough adjustment with the above-mentioned equation, such that the adjustment cannot be lower than the adjustment target pressure $P_m$.

<Third Embodiment>

An automatic analyzer according to a third embodiment of the present invention will be described with reference to FIG. 7.

The automatic analyzer of the embodiment is a device in which a control method of the proportional solenoid valve disposed as the throttling unit 101 is modified with respect to the automatic analyzer according to the second embodiment.

In the automatic analyzer according to the embodiment, when the measurement result of the pressure of the cleaning flow path 106 is deviated from the adjustment target pressure $P_m$, the control unit 103 adjusts the opening and closing degree of the proportional solenoid valve by varying the applied current to the proportional solenoid valve by PI control according to a pressure deviation amount.

However, as described above, the hysteresis exists in the proportional solenoid valve. Therefore, it is required to perform the PI control so as not to be affected by the hysteresis. FIG. 7 illustrates a specific example of an image of the PI control in the embodiment.

Figure 7:
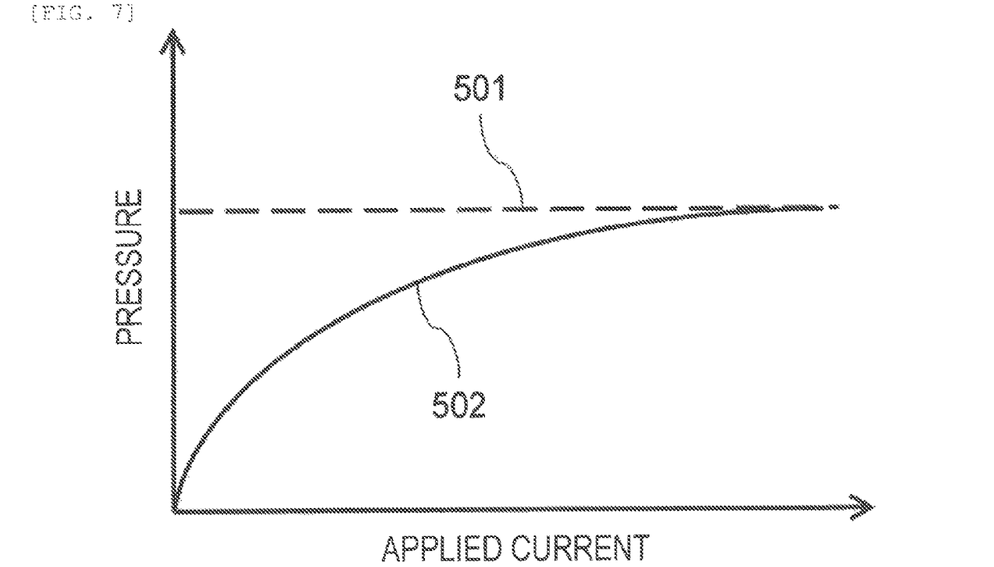
FIG. 7 is a diagram illustrating an adjustment image of an opening and closing degree of a proportional solenoid valve in an automatic analyzer according to a third embodiment.

As illustrated in FIG. 7, the control unit 103 of the embodiment calculates the deviation amount between the pressure measurement result of the cleaning flow path 106 and an adjustment target pressure $P_m$ 501 (corresponding to step S404 in FIG. 5). Thereafter, a parameter in which an overshoot allowable value does not exceed the adjustment target pressure $P_m$ 501 of the cleaning flow path 106 is set so that the pressure of the cleaning flow path 106 does not overshoot the adjustment target pressure $P_m$.

Other configurations and operations are approximately the same as those of the automatic analyzer according to the first embodiment described above, and the details thereof will be omitted.

Even in the automatic analyzer according to the third embodiment of the present invention, approximately the same effect as that of the automatic analyzer according to the first embodiment described above can be obtained.

Further, the throttling unit 101 is the proportional solenoid valve, and even though the control unit 103 performs the PI control so that the overshoot allowable value of the proportional solenoid valve does not exceed the adjustment target pressure $P_m$ of the cleaning flow path 106, the proportional solenoid valve can be controlled so that the pressure value of the cleaning flow path 106 becomes the predetermined pressure without being affected by the hysteresis.

<Others>

Further, the present invention is not limited to the above-mentioned embodiments, but includes various modifications. The above-mentioned embodiments are described in detail to describe the invention in an easy-to-understand manner, and are not necessarily limited to those having all the described configurations. Further, a part of a configuration of one embodiment can be replaced with a configuration of another embodiment, and further, the configuration of another embodiment can be added to the configuration of one embodiment. Further, it is also possible to add, delete, and replace other configurations with respect to a part of the configuration of each embodiment.

In the above-mentioned embodiments, a case in which the throttling unit 101, particularly, the proportional solenoid valve is disposed in the return flow path 105 is described, but the throttling unit 101 disposed in the return flow path 105 is not limited to the proportional solenoid valve. For example, the return flow path 105 is formed of a plurality of flow paths, and it is conceivable to adjust the number of opening and closing valves which are opened and closed according to the discharge pressure of the gear pump 34 by providing the opening and closing valves which are only opened and closed in each of the plurality of flow paths. In this case, the plurality of flow paths may respectively have the same pipe diameter or different pipe diameters.

Further, the reagent probes 7a and 8a and the sample probes 11a and 12a are described as examples of the dispensing probes, however, the dispensing probe is not limited thereto, and can also be applied to a flow path which cleans a mechanism of a probe type which has a probe shape and of which the inner surface is cleaned by discharging the cleaning water.

Furthermore, execution of the automatic pressure adjustment as illustrated in FIGS. 3 and 5 is not limited to the time of activation of the automatic analyzer 100, and may be executed at the time of standby of the automatic analyzer 100 or based upon an instruction from the operator.

REFERENCE SIGNS LIST

1: reaction disk
2: reaction container
3: cleaning mechanism
4: spectrophotometer
5, 6: stirring mechanism
7, 8: reagent dispensing mechanism
7a, 8a: reagent probe (dispensing probe)
9: reagent disk
10: reagent bottle
11, 12: sample dispensing mechanism
11a, 12a: sample probe (dispensing probe)
13, 14: cleaning tank
15: sample container
16: sample rack
17: sample conveying mechanism
18: reagent syringe
19: sample syringe
20: cleaning pump
21: controller
23, 24: cleaning container 29, 30: cleaning tank for stirring mechanism
31, 32: cleaning tank for reagent dispensing mechanism
34: gear pump
100: automatic analyzer
101: throttling unit (flow rate adjustment unit)
102: pressure sensor
103: control unit
104: branch pipe
104a: filter
105: return flow path
106: cleaning flow path
107, 108, 109, 110: solenoid valve
111, 112: reagent probe pressure sensor
113, 114: sample probe pressure sensor
201: water storage unit
501: adjustment target pressure $P_m$
502: pressure transition

The invention claimed is:

1. An automatic analyzer configured to dispense a sample and a reagent into a reaction container for reaction with each other and measures the reacted liquid, comprising:
   a dispensing probe configured to dispense the reagent and the sample into the reaction container;
   a gear pump configured to supply cleaning water to the dispensing probe;
   a cleaning flow path configured to feed the cleaning water discharged from the gear pump up to the dispensing probe;
   a pressure sensor configured to measure pressure of the cleaning flow path;
   a return flow path which is disposed in parallel to the gear pump and connects a discharging port side of the gear pump and an aspirating port side thereof;
   a flow rate adjustment unit which is disposed in the return flow path and is configured to adjust a flow rate of the cleaning water flowing through the return flow path; and
   a control unit configured to adjust the flow rate of the cleaning water flowing through the return flow path by changing an opening and closing degree of the flow rate adjustment unit according to a measurement result of the pressure sensor.

2. The automatic analyzer according to claim 1, wherein the control unit is further configured to compare an adjustment target pressure with a pressure value of the cleaning flow path measured by the pressure sensor, and, when the pressure value is different from the adjustment target pressure, perform control to change the opening and closing degree of the flow rate adjustment unit so that the pressure of the cleaning flow path becomes the adjustment target pressure.

3. The automatic analyzer according to claim 2, wherein the control unit is further configured to change the flow rate adjustment unit in an opening direction when the cleaning flow path has higher pressure than the adjustment target pressure, and change the flow rate adjustment unit in a closing direction when the cleaning flow path has lower pressure than the adjustment target pressure.

4. The automatic analyzer according to claim 3, wherein the flow rate adjustment unit is a proportional solenoid valve, and
   the control unit is further configured to limit an opening and closing direction of the proportional solenoid valve to one direction and perform adjustment of the opening and closing degree in multiple stages when adjusting the cleaning flow path to the adjustment target pressure.

5. The automatic analyzer according to claim 4, wherein the control unit is further configured to adjust the proportional solenoid valve in multiple stages only in the closing direction.

6. The automatic analyzer according to claim 3, wherein the flow rate adjustment unit is a proportional solenoid valve, and
   the control unit is configured to record a transition of a control value for driving the proportional solenoid valve and determine a life span of the gear pump.

7. The automatic analyzer according to claim 3, wherein the flow rate adjustment unit is a proportional solenoid valve, and
   the control unit is further configured to perform PI control so that an overshoot allowable value of the proportional solenoid valve does not exceed the adjustment target pressure of the cleaning flow path.

8. The automatic analyzer according to claim 1, further comprising:
   a branch pipe configured to branch the cleaning flow path to each of the dispensing probes; and
   a probe pressure sensor configured to measure pressure of the cleaning water discharged from the dispensing probe, wherein
   the control unit is further configured to determine abnormality of the cleaning flow path based upon a difference between a measured value of the pressure sensor and a measured value of the probe pressure sensor.

9. The automatic analyzer according to claim 8, further comprising:
   a filter which is provided in the branch pipe to eliminate a foreign substance in the cleaning water, wherein
   the control unit is further configured to determine a clogging state of the filter as the abnormality.

10. The automatic analyzer according to claim 1, further comprising:
    a water storage unit for storing the cleaning water; and
    a pump configured to supply the cleaning water stored in the water storage unit to the gear pump;
    wherein the return flow path is connected to the aspirating port side of the gear pump between the pump and the gear pump.

11. The automatic analyzer according to claim 1, further comprising:
    a water storage unit configured to store the cleaning water; and
    an opening and closing valve provided in the cleaning flow path and configured to return the cleaning water to the water storage unit.

* * * * *